United States Patent
Fan et al.

(10) Patent No.: US 9,859,949 B2
(45) Date of Patent: Jan. 2, 2018

(54) BLIND UPLINK INTERFERENCE CANCELLATION IN WIRELESS NETWORKING

(75) Inventors: Zhifei Fan, San Diego, CA (US); Renqiu Wang, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1564 days.

(21) Appl. No.: 12/986,831

(22) Filed: Jan. 7, 2011

(65) Prior Publication Data
US 2012/0008511 A1 Jan. 12, 2012

Related U.S. Application Data

(60) Provisional application No. 61/293,959, filed on Jan. 11, 2010.

(51) Int. Cl.
*H04W 52/24* (2009.01)
*H04B 1/7107* (2011.01)
*H04J 11/00* (2006.01)

(52) U.S. Cl.
CPC .......... *H04B 1/7107* (2013.01); *H04J 11/005* (2013.01); *H04J 11/0036* (2013.01)

(58) Field of Classification Search
USPC ........................................................ 370/252
See application file for complete search history.

(56) References Cited

U.S. PATENT DOCUMENTS 6,490,442 B1 * 12/2002 Billon .................. 455/226.1
8,559,946 B2 10/2013 Xu et al.

2003/0003906 A1 * 1/2003 Demers et al. ............... 455/424
2004/0203457 A1 10/2004 Rikola et al.
2007/0032199 A1 * 2/2007 Chang et al. .................. 455/69
2008/0008113 A1 * 1/2008 Cho et al. ..................... 370/318
(Continued)

FOREIGN PATENT DOCUMENTS

CN 1275297 A 11/2000
WO 2008086532 A1 7/2008
(Continued)

OTHER PUBLICATIONS

International Search Report and Written Opinion—PCT/US2011/020891, ISA/EPO—May 24, 2011.
Taiwan Search Report—TW100101002—TIPO—Nov. 3, 2011.

*Primary Examiner* — Yemane Mesfin
*Assistant Examiner* — Jeff Banthrongsack
(74) *Attorney, Agent, or Firm* — Holland & Hart LLP

(57) ABSTRACT

Blind interference cancellation is described for wireless networks in which a subject base station or cancellation apparatus obtains semi-static information for at least one of its neighboring cells. The base station measures the noise level of each of the neighboring cells based on samples it takes of uplink transmissions in each of the neighboring cells. The neighboring cells are then ranked for interference cancellation based on their relative noise levels. The base station performs discontinuous transmission (DTX) detection to identify at least one interfering user equipment (UE) in the neighboring cell and cancels interference attributable to those identified interfering UEs. The DTX detection and cancellation are then repeated for the remaining neighboring cells in the order they are ranked.

27 Claims, 13 Drawing Sheets

(56) References Cited

U.S. PATENT DOCUMENTS

| | | |
|---|---|---|
| 2009/0122736 A1* | 5/2009 | Damnjanovic et al. ...... 370/311 |
| 2009/0196162 A1 | 8/2009 | Sambhwani et al. |
| 2010/0061356 A1* | 3/2010 | Qvarfordt et al. ............ 370/338 |
| 2010/0085913 A1* | 4/2010 | Subrahmanya ............... 370/328 |

FOREIGN PATENT DOCUMENTS

| | | |
|---|---|---|
| WO | WO-2009099915 | 8/2009 |
| WO | WO-2009100220 | 8/2009 |
| WO | WO2010003034 A1 | 1/2010 |

\* cited by examiner

BLIND UPLINK INTERFERENCE CANCELLATION IN WIRELESS NETWORKING

CROSS-REFERENCE TO RELATED APPLICATIONS

This application claims the benefit of U.S. Provisional Patent Application No. 61/293,959, entitled, "BLIND UPLINK INTERFERENCE CANCELLATION IN WIRELESS NETWORKING", filed on Jan. 11, 2010, which is expressly incorporated by reference herein in its entirety.

BACKGROUND

Field

Aspects of the present disclosure relate generally to wireless communication systems, and more particularly, to blind uplink interference cancellation in wireless networking.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

This disclosure relates to blind interference cancellation for wireless networks in which a subject base station or cancellation apparatus obtains semi-static information for at least one of its neighboring cells. The base station evaluates the noise level of each of the neighboring cells based on samples it takes of uplink transmissions in the neighboring cells. The neighboring cells are ranked for interference cancellation based on their relative noise levels. The base station then performs discontinuous transmission (DTX) detection to identify at least one interfering user equipment (UE) in the neighboring cell and cancels interference attributable to those identified interfering UEs. The DTX detection and cancelation are then repeated for the remaining neighboring cells in the order they are ranked.

In one aspect of the disclosure, a method of wireless communication includes obtaining semi-static information for at least one neighboring cell of a wireless network and estimating a noise level in each of the neighboring cells. The method also includes, for each neighboring cell, performing DTX detection to identify at least one interfering UE and cancelling interference attributable to the interfering UEs.

In an additional aspect of the disclosure, an apparatus configured for wireless communication includes means for obtaining semi-static information for at least one neighboring cell of a wireless network and means for estimating a noise level in each of the neighboring cells. The apparatus also includes, for each of the neighboring cells, means for performing DTX detection to identify at least one interfering UE and means for cancelling interference attributable to the interfering UEs.

In an additional aspect of the disclosure, a computer program product has a computer-readable medium having program code recorded thereon. This program code includes code to obtain semi-static information for at least one neighboring cell of a wireless network and code to estimate a noise level in each of the neighboring cells. The computer program product also includes code to perform DTX detection to identify at least one interfering UE and code to cancel interference attributable to the interfering UEs, wherein the code to perform and the code to cancel are executable for each of the neighboring cells.

In an additional aspect of the disclosure, an apparatus includes at least one processor and a memory coupled to the processor. The processor is configured to obtain semi-static information for at least one neighboring cell of a wireless network and to estimate a noise level in each of the neighboring cells. The processor is further configured, for each of the neighboring cells, to perform DTX detection to identify at least one interfering UE and to cancel interference attributable to the interfering UEs.

BRIEF DESCRIPTION OF THE DRAWINGS

FIG. 14 illustrates a functional block diagram of an exemplary implementation of a second phase of a DTX detection process.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2).

The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
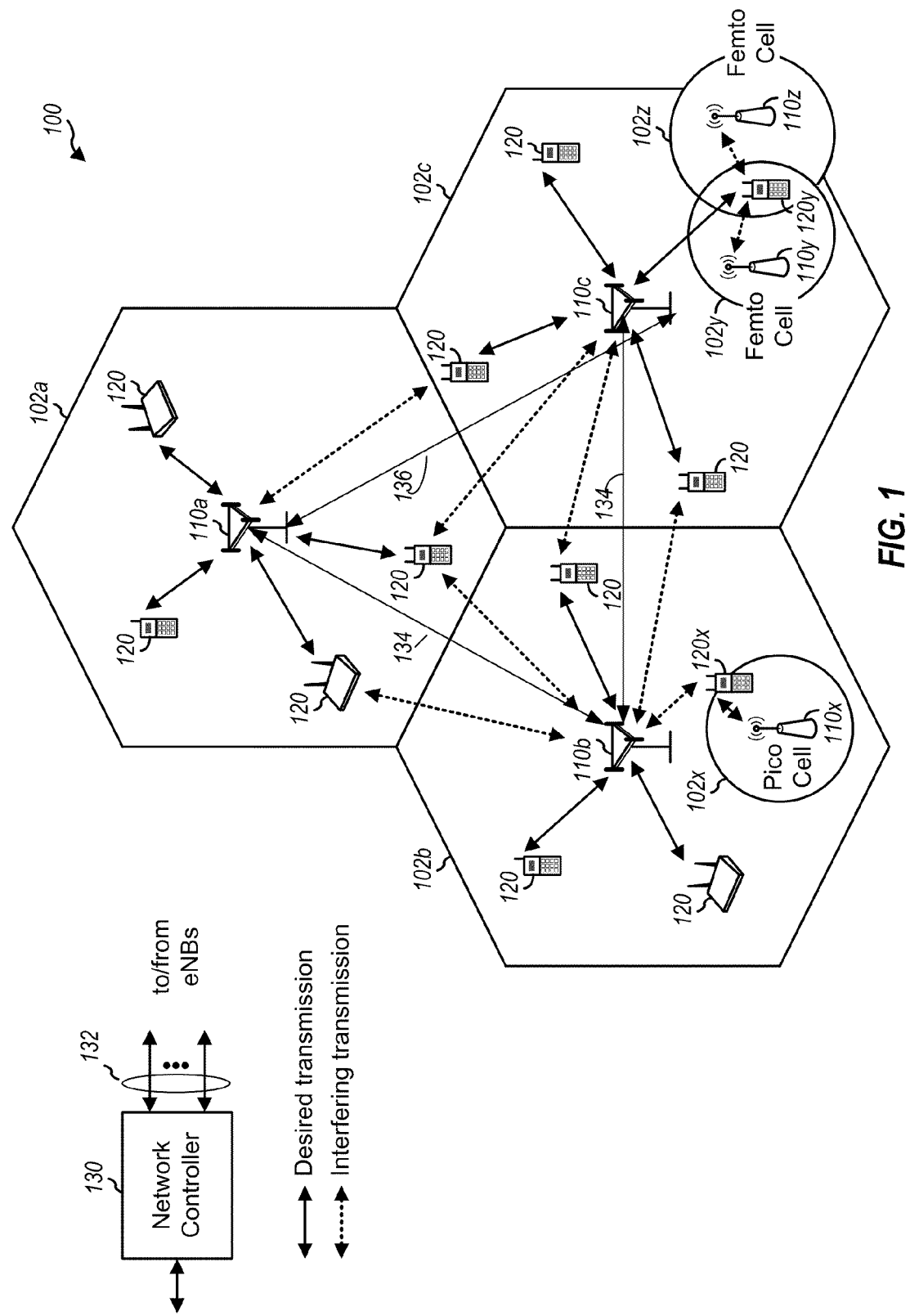
FIG. 1 illustrates a block diagram of an exemplary mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs (e.g., a base station, a node B, an access point, etc.). Each eNB 110 may provide communication coverage for a particular geographic area. The term "cell" may refer to this particular geographic coverage area of an eNB and/or an eNB subsystem serving the coverage area.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition may or may not provide restricted access to UEs associated with the femto cell (e.g., UEs in a closed subscriber group (CSG), UEs for users in the home, etc.). An eNB for a macro cell may be referred to as a macro eNB; an eNB for a pico cell may be referred to as a pico eNB; and, an eNB for a femto cell may be referred to as a femto eNB or a home eNB. In FIG. 1, the eNBs 110a, 110b and 110c are macro eNBs for the macro cells 102a, 102b and 102c, respectively; the eNB 110x is a pico eNB for a pico cell 102x; and, the eNBs 110y and 110z are femto eNBs for the femto cells 102y and 102z, respectively. An eNB may support one or multiple (e.g., two, three, four, etc.) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for synchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
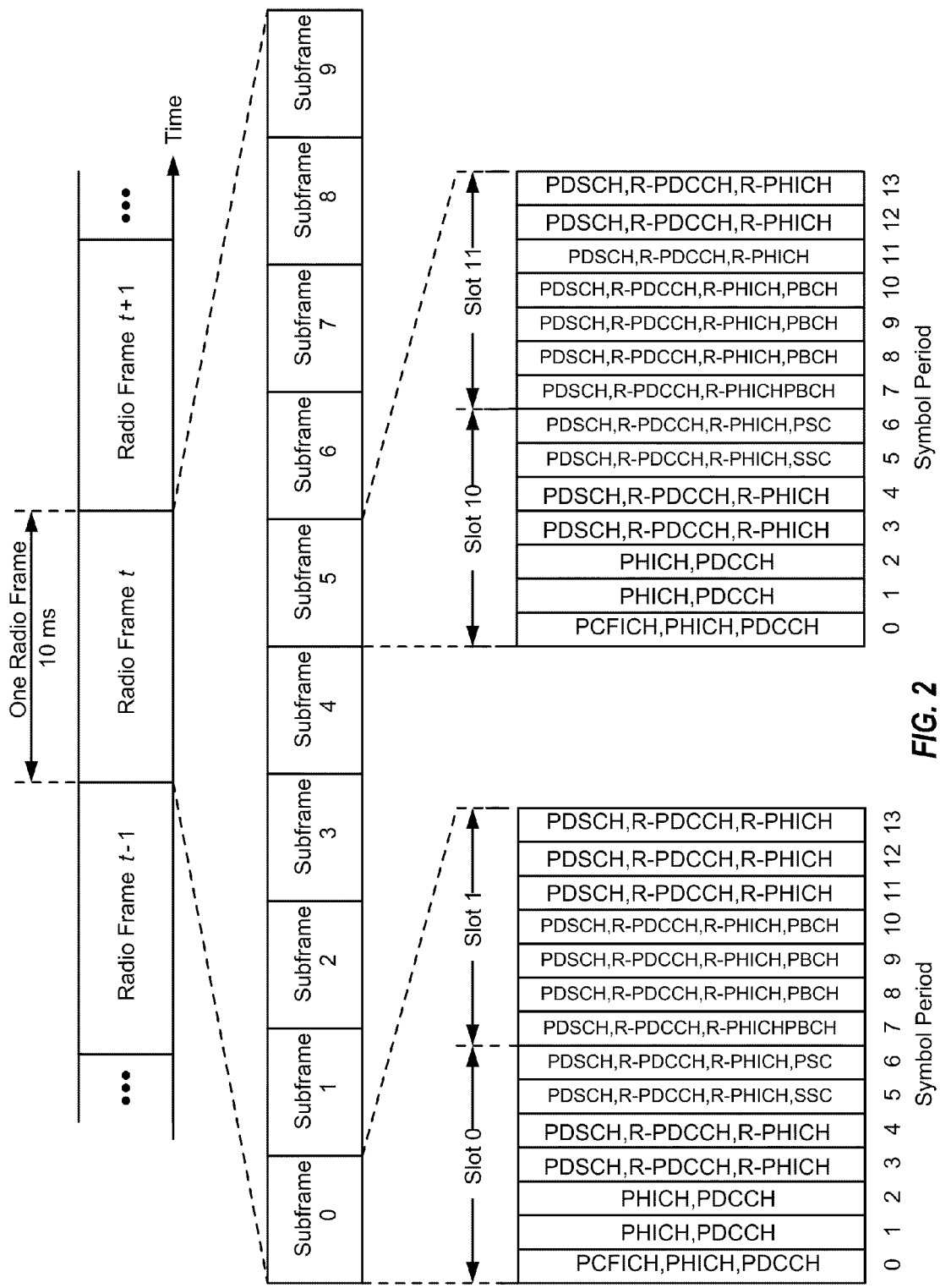
FIG. 2 illustrates a block diagram of an exemplary downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well.

As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
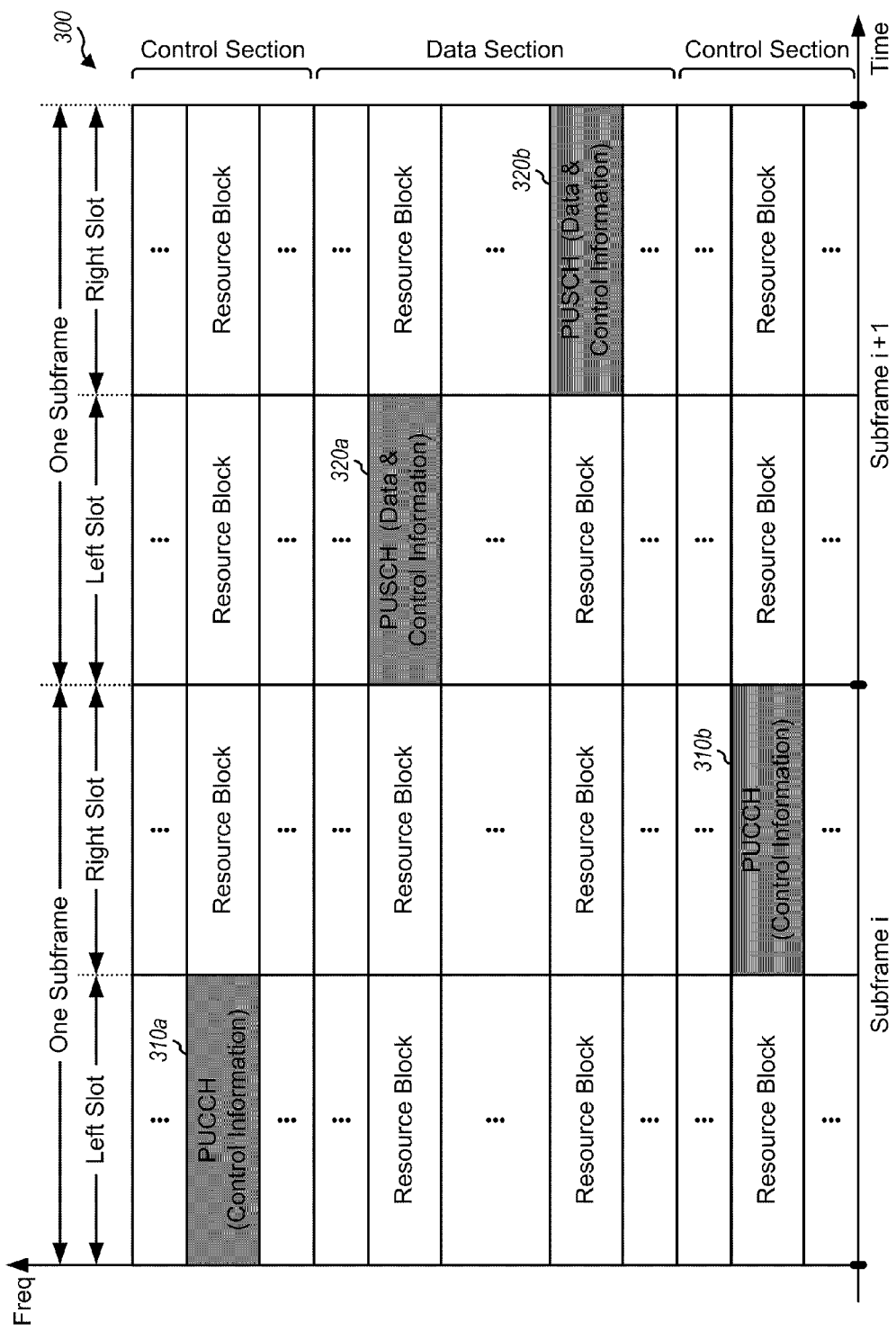
FIG. 3 illustrates a block diagram of an exemplary frame structure in uplink LTE/-A communications.

FIG. 3 illustrates an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, as provided in the LTE Release 8 standard, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
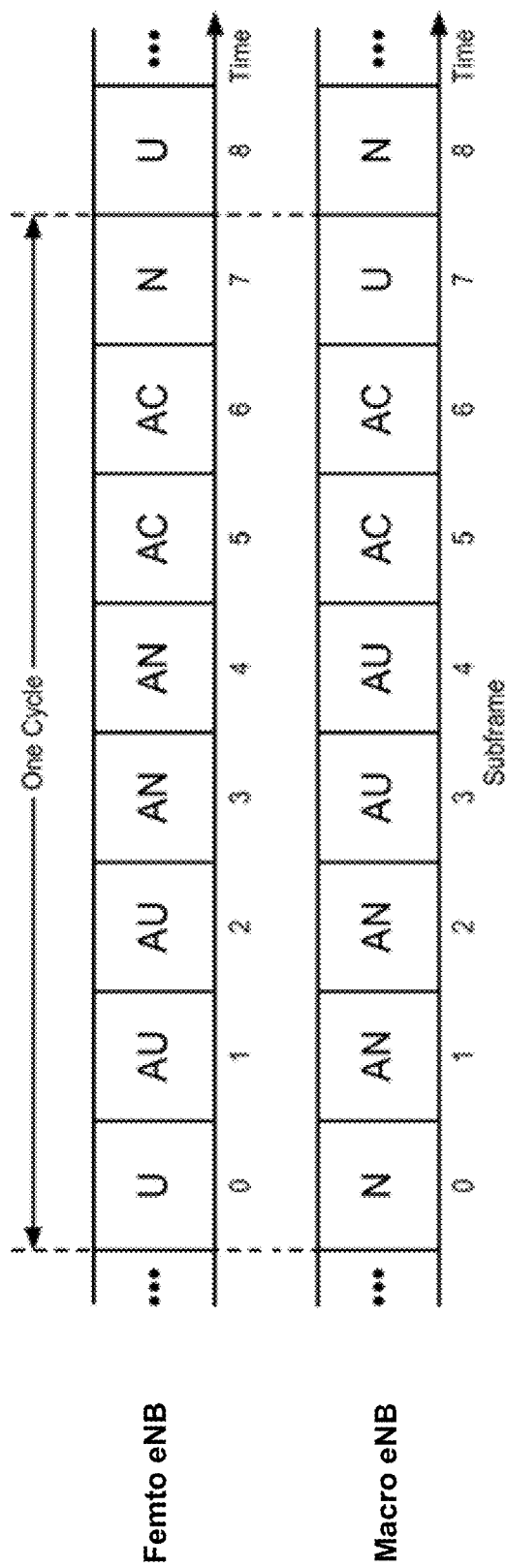
FIG. 4 illustrates a block diagram of an exemplary time division multiplexed (TDM) partitioning in a heterogeneous network.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120$y$ may be close to the femto eNB 110$y$ and may have high received power for the eNB 110$y$. However, the UE 120$y$ may not be able to access the femto eNB 110$y$ due to restricted association and may then connect to the macro eNB 110$c$ (as shown in FIG. 1) or to the femto eNB 110$z$ also with lower received power (not shown in FIG. 1). The UE 120$y$ may then observe high interference from the femto eNB 110$y$ on the downlink and may also cause high interference to the eNB 110$y$ on the uplink. Using coordinated interference management, the eNB 110$c$ and the femto eNB 110$y$ may communicate over the backhaul 134 to negotiate resources. In the negotiation, the femto eNB 110$y$ agrees to cease transmission on one of its channel resources, such that the UE 120$y$ will not experience as much interference from the femto eNB 110$y$ as it communicates with the eNB 110$c$ over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km±3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
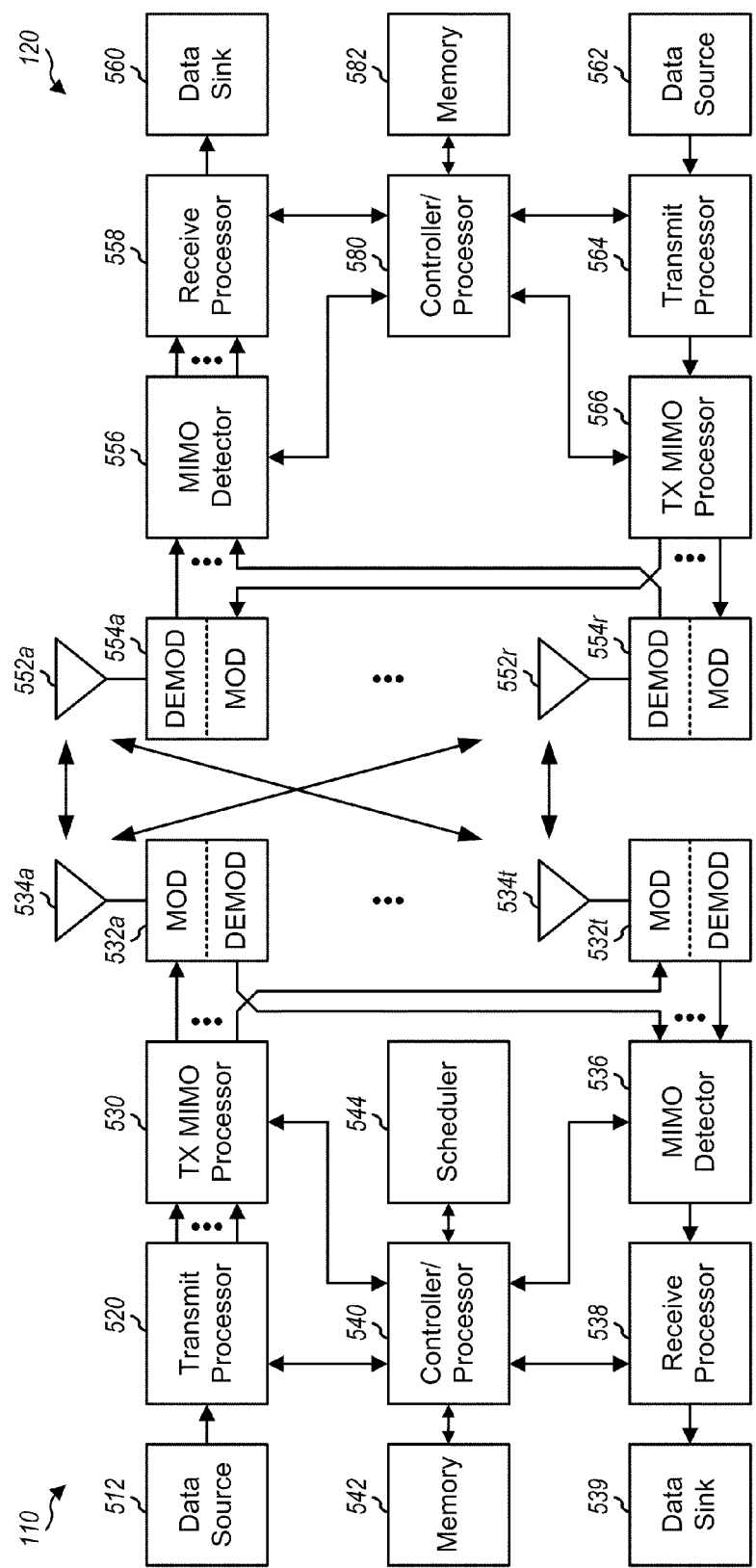
FIG. 5 illustrates a block diagram of an exemplary design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The receive processor 538 may provide the decoded data to a data sink 539 and the decoded control information to the controller/processor 540.

The controllers/processors 540 and 580 may direct the operation at the eNB 110 and the UE 120, respectively. The processor 540 and/or other processors and modules at the eNB 110 may perform or direct the execution of various processes for the techniques described herein. The processor 580 and/or other processors and modules at the UE 120 may also perform or direct the execution of the functional blocks illustrated in FIGS. 4 and 5, and/or other processes for the techniques described herein. The memories 542 and 582 may store data and program codes for the eNB 110 and the UE 120, respectively. A scheduler 544 may schedule UEs for data transmission on the downlink and/or uplink.

In recent years, users have started to replace fixed line communications with mobile communications and have increasingly demanded great voice quality, reliable service, and low prices. One problem associated with high quality mobile communications is the task of improving best-effort traffic in multiple access systems. Although multiple access enables increased network loading, it can also result in increased interference, degrading wireless communications. Accordingly, improved interference mitigation has been an increased priority for wireless system designers in recent years. One common mechanism for interference mitigation is planned deployment, where large macro base stations are positioned a sufficient distance from other such base stations as to cause minimal inter-cell interference. Other techniques for mitigating interference in a planned deployment include beamshaping, transmit power management, and the like.

Further to the above, the aforementioned femto cells, which may be installed in a user's home and provide indoor wireless coverage to mobile units using existing broadband Internet connections. Such personal miniature base stations are generally known as femto cells, but also as access point base stations, Home Node B (HNB), and the like. Typically, such miniature base stations are connected to the Internet and the mobile operator's network via DSL router or cable modem. Because these personal base stations are deployed by individual system users, rather than a network provider, location of these base stations is unplanned, and can frustrate interference mitigation mechanisms based on planned deployment. For instance, a macro base station that is very close to a femto cell can cause very high interference for the femto cell.

Figure 6:
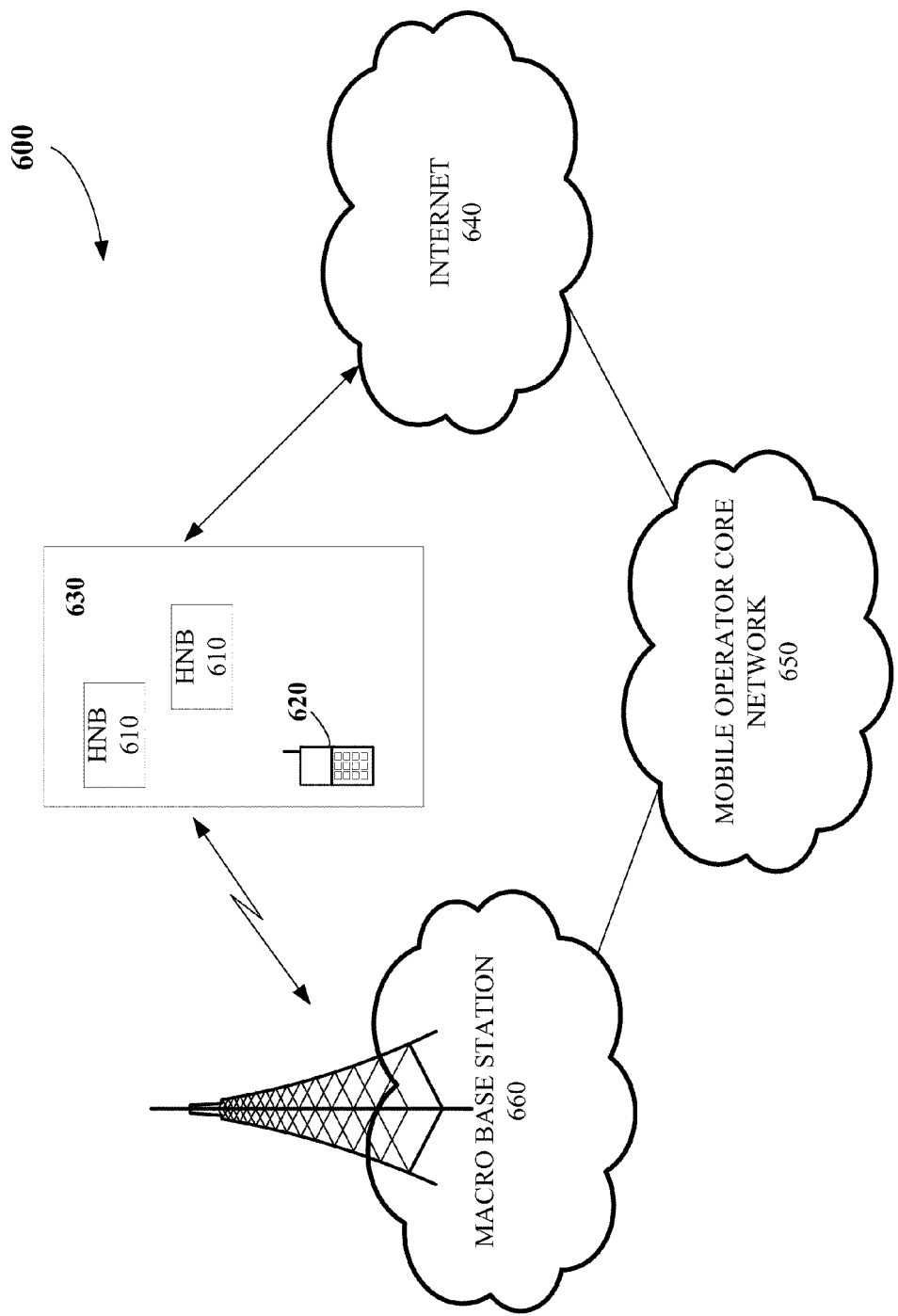
FIG. 6 illustrates an exemplary communication system to enable deployment of access point base stations within a network environment.

FIG. 6 illustrates an exemplary communication system to enable deployment of access point base stations within a network environment. As shown in FIG. 6, the system 600 includes multiple access point base stations, HNBs, or femto cells, such as, for example, HNBs 610, each being installed in a corresponding small scale network environment, such as, for example, in one or more user residences 630, and being configured to serve associated, as well as alien, UE 620. Each HNB 610 is further coupled to the Internet 640 and a mobile operator core network 650 via a network interface, such as a DSL router (not shown), a cable modem (not shown), or the like.

Although aspects described herein use 3GPP terminology, it is to be understood that the aspects may be applied to 3GPP (Re199, Re15, Re16, Re17) technology, as well as 3GPP2 (1×RTT, 1×EV-DO Re10, RevA, RevB) technology and other known and related technologies. In such aspects described herein, the owner of the HNB 610 subscribes to mobile service, such as, for example, 3G mobile service, offered through the mobile operator core network 650, and the UE 620 is capable to operate both in macro cellular environment and in residential small scale network environment. Thus, the HNB 610 is backward compatible with any existing UE 620.

Furthermore, in addition to the macro base station 660, the UE 620 can only be served by a predetermined number of HNBs 610, namely the HNBs 610 that reside within the user's residence 630, and cannot be in a soft handover state with the mobile operator core network 650. The UE 620 can communicate either with a macro base station 660 of the mobile operator core network 650 or the HNBs 610, but not both simultaneously. As long as the UE 620 is authorized to communicate with the HNB 610, within the user's residence, it is desired that the UE 620 communicate with the associated HNBs 610.

Figure 7:
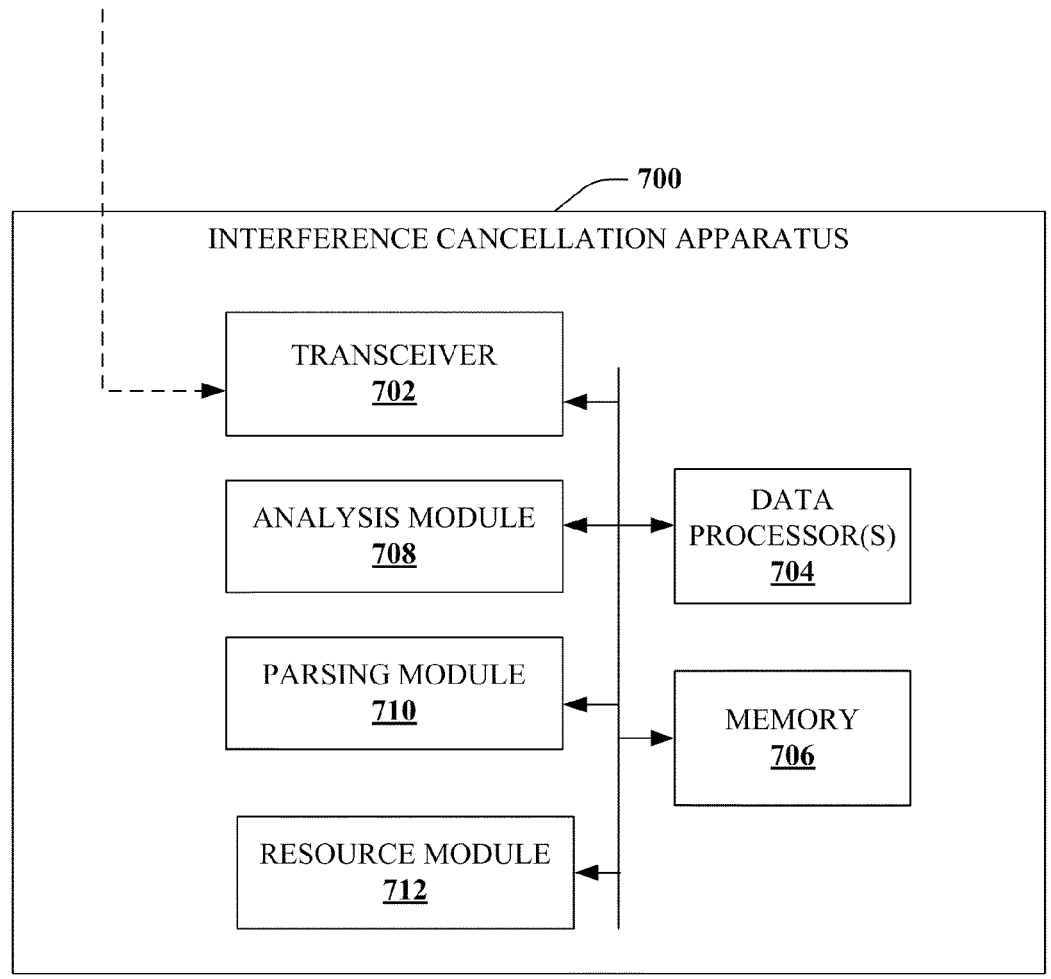
FIG. 7 illustrates a block diagram of an exemplary interference cancellation apparatus.

FIG. 7 depicts a block diagram of an example interference cancellation apparatus 700 according to particular aspects of the subject disclosure. Particularly, interference cancellation apparatus 700 can be configured for determining uplink interference cancellation, and deployed in conjunction with a base station of a wireless network. Alternatively, interference cancellation apparatus 700 can be configured for determining uplink interference cancellation for a planned network deployment receiving interference from base stations associated with an unplanned network deployment. A heterogeneous network comprising one or more femto cells mixed in with the planned network deployment could be a suitable example of the latter. Thus, in one aspect, interference cancellation apparatus 700 can be implemented at a central controller (e.g., a radio network controller [RNC], a base station controller [BSC], or the like) to provide interference cancellation for respective cells based on uplink transmissions of respective neighboring cells. In another aspect, interference cancellation apparatus 700 can be deployed with an individual base station (e.g., see FIG. 8), to provide uplink interference cancellation for a serving cell comprising the individual base station, as a result of uplink transmissions of cells neighboring (neighboring cells) or interfering with (interference cells) the serving cell. In at least one aspect, however, interference cancellation apparatus 700 can be configured to provide downlink interference cancellation based on downlink transmissions of neighboring cells, and be implemented in conjunction with a UE (e.g., see FIG. 9), or in conjunction with a repeater, wireless relay, or the like.

The interference cancellation apparatus 700 can comprise one or more wireless transceivers 702. Wireless transceiver(s) 702 can be configured to receive uplink transmissions for one or more cells of a wireless network. Particularly, wireless transceiver(s) 702 can be configured to obtain uplink transmissions within a serving cell of the wireless network, as well as one or more neighboring or interfering cells of the wireless network. The uplink transmissions can be stored in memory 706, or provided to other components or modules of interference cancellation apparatus 700.

In addition to the foregoing, interference cancellation apparatus 700 can comprise memory 706 for storing modules configured to provide blind interference cancellation for the serving cell, and a data processor 704 for executing the respective modules. For blind interference cancellation, interference cancellation apparatus 700 does not have the benefit of inter-base station communication for information from the neighboring or interfering cells. A heterogeneous network can be illustrative of problems that lead to blind interference cancellation, such as depicted in FIG. 6. Particularly, femto base stations (e.g., HNB 610) may not be equipped with a mechanism for communicating with surrounding macro base stations (e.g., macro base station 660 of FIG. 6) of a planned mobile operator's core network 650. Accordingly, uplink scheduling for terminals served by the femto base stations cannot be provided to the surrounding macro base stations. Likewise, due to a lack of inter-cell communication between the macro base stations and the femto base stations, uplink scheduling for terminals served by the macro base stations might not be accessible to the femto base stations. Accordingly, conventional interference cancellation requiring explicit sharing of terminal scheduling per uplink channel is difficult or impossible. To address this concern, interference cancellation apparatus 700 can provide blind interference cancellation that does not require explicit sharing of terminal scheduling. Rather, interference cancellation apparatus 700 is configured to estimate or derive enough information to perform interference cancellation of the interfering cells, as is described in more detail below.

The interference cancellation apparatus 700 can comprise an analysis module 708 that extracts uplink resource information for a neighboring cell of the wireless network from a broadcast transmission of the neighboring cell, such as a master information block (MIB), system information blocks (SIBs), or the like. The broadcast transmission can be acquired by wireless transceiver(s) 702 in some aspects. In other aspects, semi-static control information included in the broadcast transmission can be relayed by UEs operating in the neighboring cell. In the latter case, analysis module 708 can extract the uplink resource information from the uplink transmissions obtained by wireless transceiver(s) 702 (comprising one or more UE transmitted signals that include the semi-static control information). In another example, some limited inter-cell sharing could exist between the neighboring cell and the serving cell, for instance via an operator's core network, or through an Internet gateway, or the like.

Further to the above, interference cancellation apparatus 700 can comprise a parsing module 710 that performs an aggregate interference cancellation on uplink transmissions of the neighboring cell and extracts UE-specific neighboring signals from the aggregate interference cancellation. As a particular example, the aggregate interference cancellation can comprise interference cancellation based on aggregated uplink transmissions of the neighboring cell. In other words, uplink interference cancellation for the entire cell (or a portion thereof depending on the fraction of neighboring cell transmissions included in the uplink transmissions received by wireless transceiver(s) 702), rather than interference cancellation for respective UEs of the neighboring cell. Once cell-wide interference cancellation is performed for the neighboring cell, individual uplink signals of particular UEs within the neighboring cell can be identified. These individual uplink signals can comprise the UE-specific neighboring signals extracted by parsing module 710.

In addition, interference cancellation apparatus 700 can comprise a resource module 712 that derives an uplink control channel schedule for the neighboring cell from the uplink resource information and the UE-specific neighboring signals, wherein the uplink control channel schedule facilitates the interference cancellation for the serving cell.

Particularly, it should be appreciated that this interference cancellation is blind, in that it does not require explicit uplink control channel scheduling provided by the neighboring cell, as required by conventional interference cancellation algorithms. Instead, the uplink control channel schedule is derived from measuring of uplink transmissions of the neighboring cell. Accordingly, interference cancellation apparatus 700 can provide uplink interference cancellation even for heterogeneous networks comprising base stations with limited inter-cell communication.

According to particular aspects of the subject disclosure, the uplink control channel schedule can comprise scheduling of individual UEs of the neighboring cell into distinct uplink resources. The scheduling can be limited duration (e.g., for one time frame, multiple time frames, one subframe, and so on), or fixed duration, in various aspects. In either case, parsing module 710 can employ one of a set of analysis algorithms for extracting the UE-specific neighboring signals. In one aspect, selection of the analysis algorithms can depend on a type of channel the uplink transmissions are associated with. For uplink acknowledgment (ACK) channels, the parsing module 710 can employ a first set of algorithms, whereas for uplink channel quality indicator (CQI) channels, or mixed ACK/CQI uplink channels, parsing module 710 can employ a different set of algorithms. This enables fine-tuned signal analysis for different uplink control channels.

In one particular aspect, parsing module 710 employs two rounds of analysis algorithms to extract the UE-specific neighboring signals. The first round of analysis algorithms is dependent on the type of control channel in this aspect, whereas the second round of analysis algorithms can be static for different control channel types. More specifically, the first round of signal analysis can employ tri-state decoding for an ACK channel, or signal to noise ratio (SNR) estimates for CQI or mixed ACK/CQI channels. For the second round of signal analysis, parsing module 710 can apply a second algorithm to UE-specific signal information derived from the first round of signal analysis. Specifically, a reconstructed received signal can be subtracted from an actual received signal (e.g., output from a fast Fourier transform module—not depicted—coupled with a wireless receiver, see FIG. 8) to obtain a residual signal for each UE-specific signal. These reconstructed signals can be based on results of the SNR analysis employed by algorithms providing the SNR estimates. As one example, the reconstructed signals can be symbol estimates derived from a de-mapping algorithm based on log likelihood ratios of received signals. The de-mapped symbol estimates can be re-mapped (e.g., re-encoded) to estimate the received signals, and produce the reconstructed received signals mentioned above.

It should be noted that, for purposes of this disclosure, SNR represents a measurement of the relationship between the signal, interference, and any noise, and may include SNR measurement, SINR measurements, and the like.

Once specific signals of one or more UEs are extracted from the uplink transmissions of the neighboring cells, resource module 712 can map these specific signals to the respective distinct uplink resources obtained by analysis module 708. This mapping results in the uplink resource scheduling of the neighboring cell. This uplink resource scheduling is an estimated scheduling derived from uplink signal measurements, as opposed to an explicit resource scheduling provided by the neighboring cell. Accordingly, the estimate scheduling can be implemented even where limited or no direct communication exists between the serving cell and neighboring cell. Once obtained, the uplink resource scheduling can be employed to provide uplink interference cancellation for specific signals on specific uplink resources, providing significantly reduced interference, and improving wireless communications within the serving cell.

Figure 8:
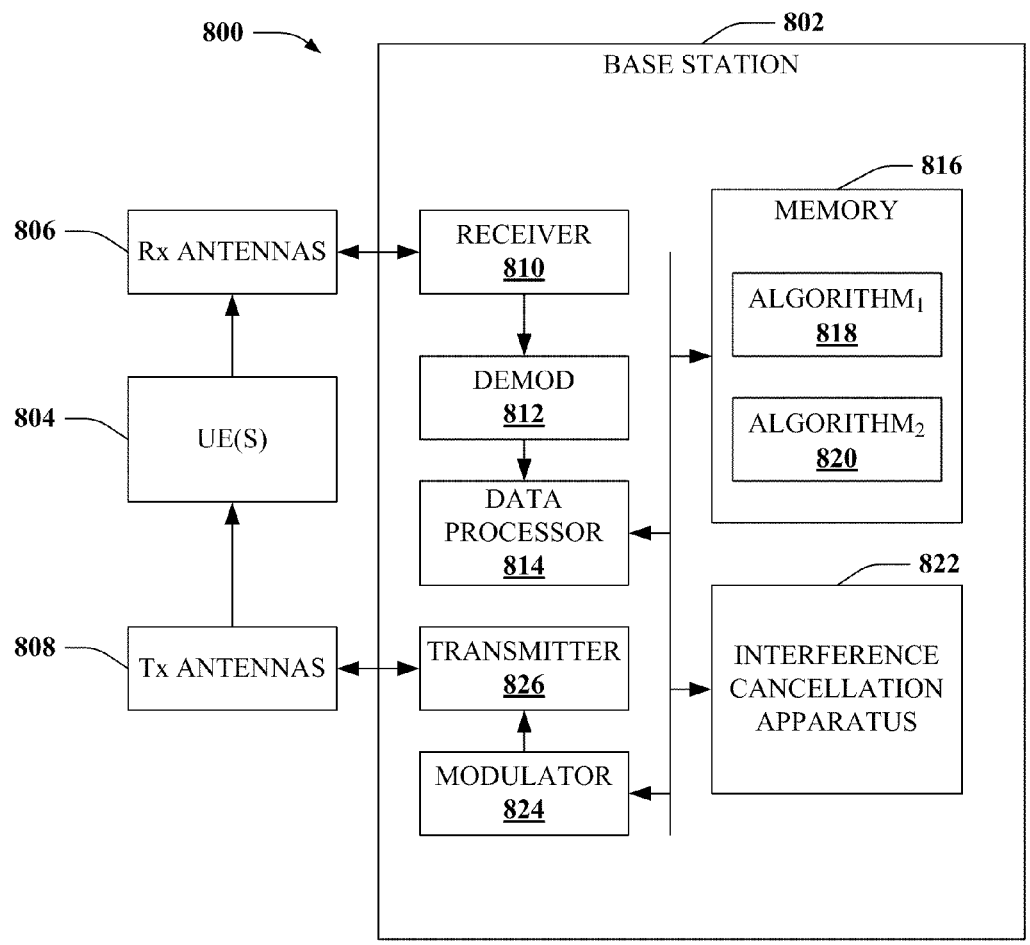
FIG. 8 illustrates a block diagram of an exemplary base station.

FIG. 8 illustrates a block diagram of an example system 800 comprising a base station 802 according to particular aspects of the subject disclosure. The base station 802 can be configured to provide improved interference cancellation in wireless communications. Particularly, the base station 802 can be configured to provide blind interference cancellation, based on measurements of uplink transmissions of interfering cells. Accordingly, the base station 802 can provide significantly improved wireless communication even for un-planned heterogeneous networks.

The base station 802 may comprise a receiver 810 that obtains wireless signals from UE(s) 804 through one or more receive antennas 806, and a transmitter 826 that sends coded/modulated wireless signals provided by a modulator 824 to the UE(s) 804 through a transmit antenna(s) 808. The receive antenna(s) 806 and transmit antenna(s) 808, along with the receiver 810 and transmitter 826, can comprise a set of wireless transceivers for implementing various aspects of the subject disclosure, as described herein. It should be appreciated that at least a subset of the UE(s) 804 are within an interfering cell of a wireless network, providing uplink interference for the base station 802.

The receiver 810 can obtain information from the receive antennas 806 and can further comprise a signal recipient (not shown) that receives uplink data transmitted by the UE(s) 804. Additionally, the receiver 810 is operatively associated with a demodulator 812 that demodulates received information. Demodulated symbols are analyzed by a data processor 814. The data processor 814 is coupled to a memory 816 that stores information related to functions provided or implemented by the base station 802.

Further to the above, the base station 802 can comprise an interference cancellation apparatus 822. The interference cancellation apparatus 822 can be substantially similar to the interference cancellation apparatus 700 in at least some aspects of the subject disclosure. However, it should be appreciated that the subject disclosure and appended claims are not so limited, except where required by context of specific language. Particularly, the interference cancellation apparatus 822 can employ one or more analysis algorithms 818, 820 stored in the memory 816 to parse the uplink transmissions and identify individual transmissions thereof, and determine a type of channel the uplink transmissions are transmitted on. Verification of individual uplink transmissions can be conducted to provide an uplink resource schedule, as described herein, for transmission-specific interference cancellation for the interfering cells or the interfering UE(s) 804.

Figure 9:
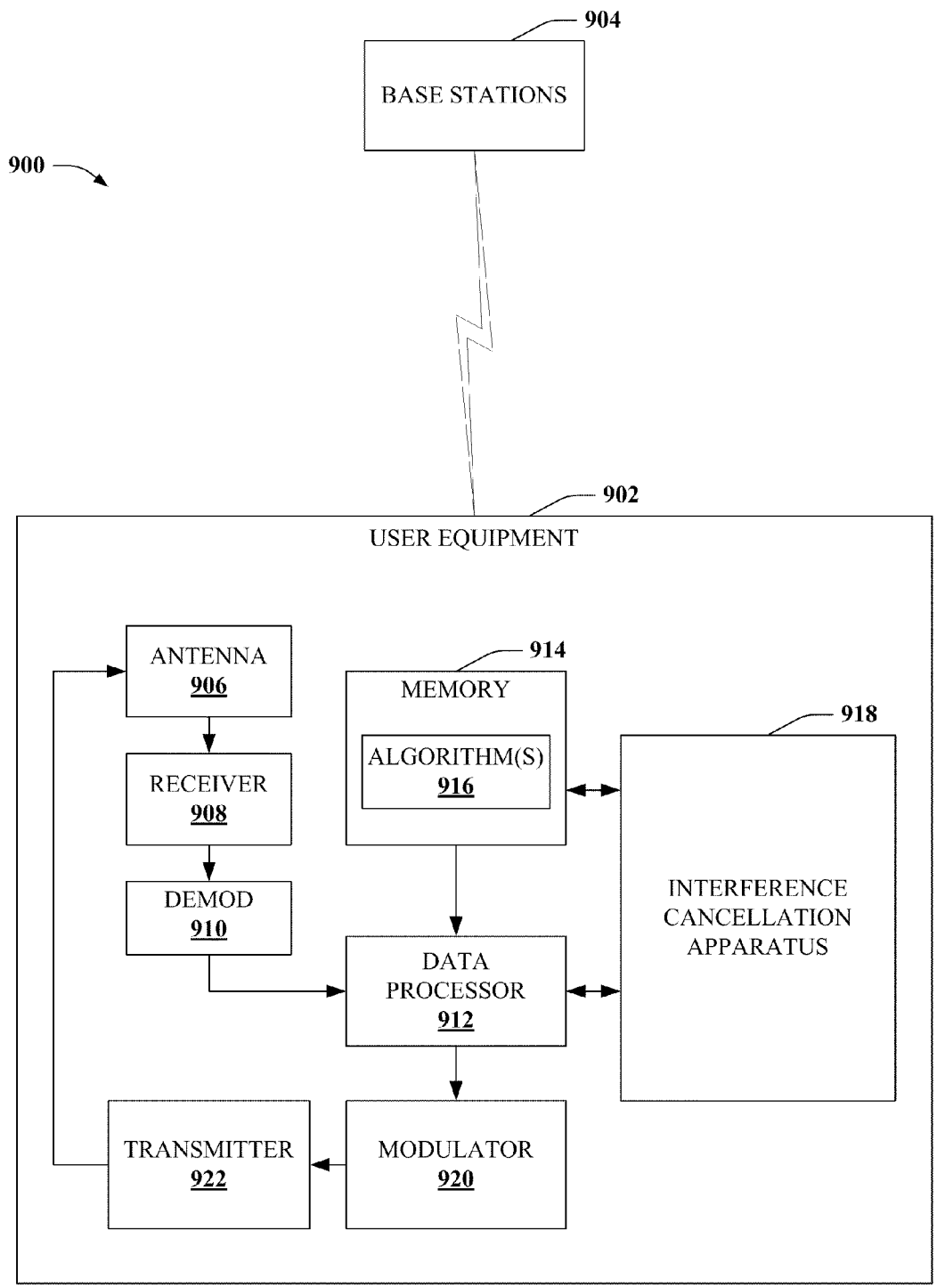
FIG. 9 illustrates a block diagram of an example system comprising a UE configured for wireless communication according to aspects of the subject disclosure.

FIG. 9 depicts a block diagram of an example system 900 comprising a UE 902 configured for wireless communication according to aspects of the subject disclosure. The UE 902 can be configured to wirelessly communicate with one or more base stations 904 of a wireless network. Based on such configuration, the UE 902 can receive wireless signals from the one or more base stations 904 on one or more forward link channels and respond with wireless signals on one or more reverse link channels. In addition, the UE 902 can comprise instructions stored in a memory 914 for implementing downlink interference cancellation for downlink transmissions of one or more neighboring or interfering base stations (not depicted).

The UE 902 includes at least one antenna 906 (e.g., comprising one or more input/output interfaces) that receives a signal and a receiver(s) 908, which perform typical actions (e.g., filters, amplifies, down-converts, etc.) on the received signal. In general, the antenna 906 and a transmitter 922 (collectively referred to as a transceiver) can be configured to facilitate wireless data exchange with the base station(s) 904.

The antenna 906 and receiver(s) 908 can also be coupled with a demodulator 910 that can demodulate received symbols and provide such signals to a data processor(s) 912 for evaluation. It should be appreciated that the data processor(s) 912 can control and/or reference one or more components (the antenna 906, the receiver 908, the demodulator 910, the memory 914, the interference cancellation apparatus 918, the modulator 920, the transmitter 922) of the UE 902. Further, the data processor(s) 912 can execute one or more modules, applications, engines, or the like that comprise information or controls pertinent to executing functions of the UE 902.

Additionally, the memory 914 of the UE 902 is operatively coupled to the data processor(s) 912. The memory 914 can store data to be transmitted, received, and the like, and instructions suitable to conduct wireless communication with a remote device (e.g., base stations 904). Specifically, the memory 914 can store one or more algorithms 916 configured to provide signal analysis of downlink transmissions of neighboring or interference base stations. Based on these downlink transmissions, the UE 902 can employ an interference cancellation apparatus 918 to analyze the downlink transmissions and provide downlink interference cancellation for signals received by the UE 902. In one aspect of the subject disclosure, the interference cancellation apparatus 918 can operate in a substantially similar manner as the interference cancellation apparatus 700, except utilizing downlink transmissions, downlink scheduling information, or base station-specific transmissions, or the like, or a combination thereof, to provide the downlink interference cancellation.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include the UE 902 and the base station 802, or a different combination of these or other apparatuses. Sub-modules could also be implemented as modules communicatively coupled to other modules rather than included within parent modules. Additionally, it should be noted that one or more modules could be combined into a single module providing aggregate functionality. For instance, the analysis module 708 can include the resource module 712, or vice versa, to facilitate extracting uplink resource information and deriving an uplink control channel schedule, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 10:
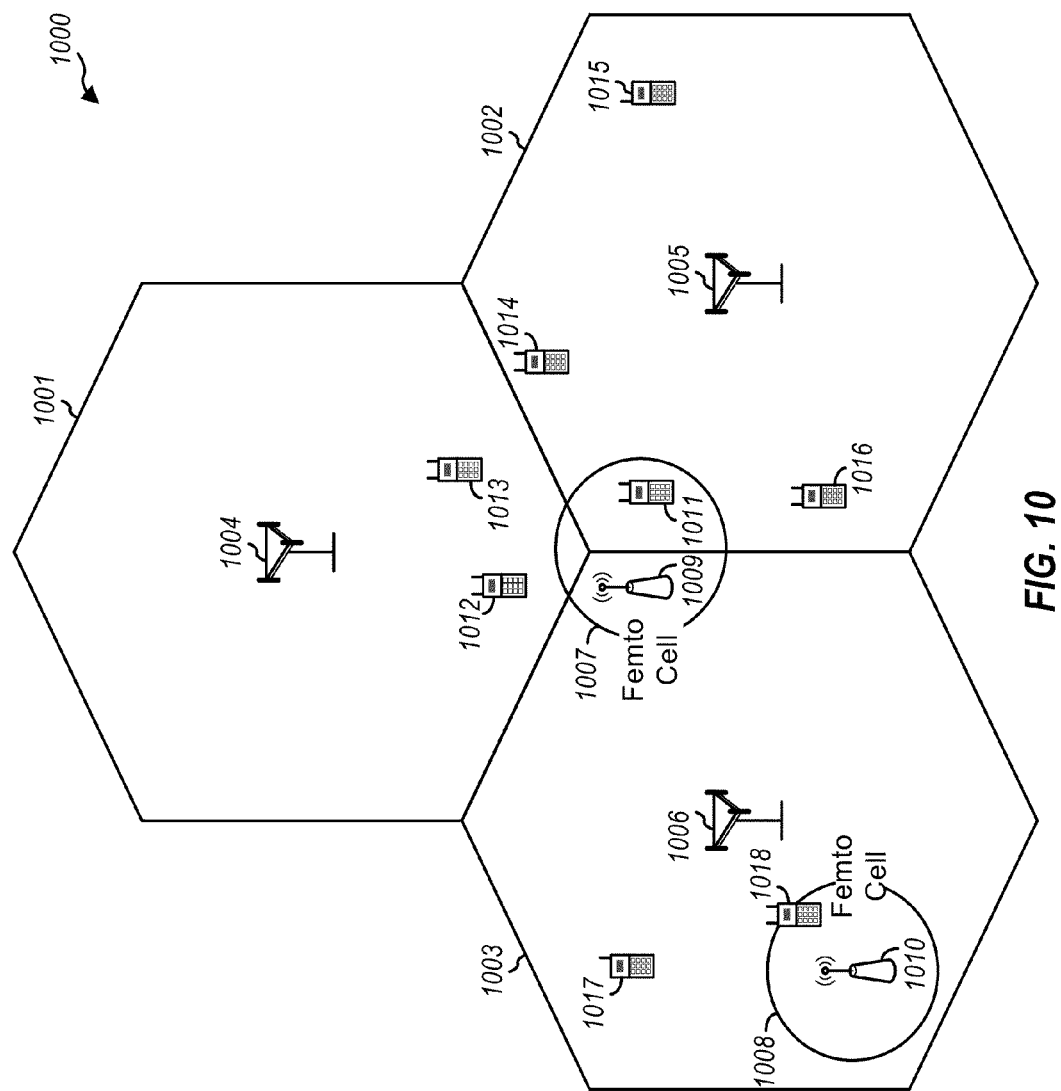
FIG. 10 illustrates a block diagram of an exemplary heterogeneous communication network configured according to one aspect of the present disclosure.

Turning now to FIG. 10, a block diagram is shown illustrating a heterogeneous communication network 1000 configured according to one aspect of the present disclosure and enabling communication with the UEs 1011-1018. The illustrated portion of the heterogeneous communication network 1000 includes cells 1001-1003, which are served by macro base stations 1004-1006, respectively. The macro base stations 1004-1006 may communicate with each other to coordinate serving resources, interference cancellation, and the like. The heterogeneous network is synchronous and has the same cyclic prefix length for the entire network. Along with macro base stations 1004-1006, which are planned deployments by the network service provider of the heterogeneous communication network 1000, unplanned femto cell placements also serve subscribers to the heterogeneous communication network 1000, for example, the femto cells 1009-1010 defining the femto coverage areas 1007-1008. Mobile devices coupling through the femto cells 1009-1010 obtain communication access to the heterogeneous communication network 1000 via an Internet connection established by the femto cells 1009-1010. The femto cells 1009-1010 are not capable of communications with any of the macro base stations 1004-1006, and, thus, cannot obtain direct system or traffic information from macro base stations 1004-1006 to provide traditional interference cancellation or coordinated operations. The femto cells 1009-1010, however, are configured according to one aspect of the present disclosure to blindly perform interference cancellation of interfering signals transmitted by various UEs communicating in neighboring cells.

For example, the femto cell 1010 is in communication with the UE 1018. However, strong uplink signals from the UE 1017, in communication with the macro base station 1006, causes a considerable amount of interference with the uplink signals from the UE 1018, as received by the femto cell 1010. The femto cell 1010 receives a signal that includes both the uplink signals from the UE 1018 and uplink signals from the UE 1017. The femto cell 1010 cannot distinguish between them and, in practice, does not even know if interference is coming from one or maybe even more UEs. The femto cell 1010 is aware of the macro base station 1006 and knows its and all of the other neighboring cells' cell identifiers (IDs). However, the femto cell 1010 has no direct information, including scheduling information, regarding the UE 1017 causing the interference, and certainly does not have enough information to perform traditional interference cancellation.

Using the known information about the macro base station 1006, the femto cell 1010 can receive and decode certain semi-static information from the macro base station 1006. Semi-static information may include the non-dynamically assigned subframes, such a subframes 0 and 7 illustrated in FIG. 4, for example. For purposes of this described example, the femto cell 1010 reads various parameters from the SIB2 broadcasted by the macro base station 1006, including the computer generated sequence (CGS) hopping configuration, the PUCCH CQI resource block region, the PUCCH mixed ACK/CQI resource block region, the maximum number of users in the PUCCH ACK resource block, the sounding reference signal (SRS) configuration, and the like. As will be described in greater detail below, the femto cell 1010 uses this semi-static information to blindly detect the PUCCH channels from the cell 1003 and perform cancellation of the strong interfering signals from the UE 1017.

In determining whether to perform cancellation, the femto cell 1010 samples uplink transmissions in the cell 1003 and measures the overall noise level of the cell 1003 using those samples. If the noise level is relatively low, this generally indicates that the cell 1003 is a strong cell, which would trigger the femto cell 1010 to begin the blind interference cancellation process. Otherwise, if the noise level is relatively high, this generally indicates that the cell 1003 is a weak cell, which may not need cancellation. When the noise level of the sampled uplink signals in the cell 1003 trigger blind interference cancellation, the femto cell 1010 will try to blindly detect PUCCH channels in the cell 1003.

The femto cell 1010 begins the blind detection process in a first phase by performing discontinuous transmission (DTX) detection of the received signals. UEs, including the UE 1017, generally are capable of transmitting at least three types of channels in the PUCCH channel of a certain resource block. The UE may transmit only an ACK channel, only a CQI channel, or a mixed ACK/CQI channel. Because different sets of information are used to decode ACK channels and CQI channels, this first DTX detection phase uses one method to decode ACK channels and another method to decode or estimate CQI channels.

The first assumption made by the femto cell 1010 is that the cell 1003, served by the macro base station 1006, is serving its maximum number of UEs. That is because the femto cell 1010 cannot differentiate signals from other UEs in the underlying received signal. This maximum number is known for each of the ACK channels and CQI channels based on the semi-static information read from the macro base station 1006. Depending on the network settings of the heterogeneous communication network 1000 (if configured as an LTE/-A network), the cell 1003 may serve a maximum of 12, 18 or 36 ACK users (UEs transmitting ACK channels in the PUCCH channel). The cell 1003 may also serve a maximum of 12 CQI users (UEs transmitting CQI channels in the PUCCH channel). Therefore, for each of the assumed maximum number of users, both assumed ACK users and assumed CQI users, the femto cell 1010 decodes or estimates the ACK and CQI channels.

The femto cell 1010 will also assume particular payload sizes for both of the ACK and CQI channels. For example, in aspects of the present disclosure in which the heterogeneous communication network 1000 is configured as an LTE/-A network, the femto cell 1010 will assume that the PUCCH ACK channel is a format $1b$ ACK channel, which provides an ACK payload size of 2 bits. Other available formats operable with the various aspects of the present disclosure would provide at least a payload size of 1 bit, which is a subset of 2 bits. Therefore, the assumption of 2 bits would be reasonable. Similarly, the femto cell 1010 will assume that the PUCCH CQI channel is a format $2b$ CQI channel. As with the additional ACK formats compatible with the various aspects of the present disclosure, the other compatible CQI formats are a subset of the format $2b$ CQI channel.

It should be noted that the definitions of the different formats provided for in LTE networks are described, as previously noted, in 3GPP TS 36.211, entitled "Evolved Universal Terrestrial Radio Access (E-UTRA); Physical Channels and Modulation," which is publicly available.

Signals for the ACK channels can be decoded using the semi-static information already known by the femto cell 1010 in addition to the noted assumptions. The femto cell 1010 will, therefore, use this information and the assumptions in a tri-state decoding process to decode the ACK channels for each of the assumed maximum ACK users. For the assumed ACK users that the femto cell 1010 is able to decode, the femto cell 1010 will designate these ACK users for further processing. In contrast, if the femto cell 1010 is unable to decode a signal for an assumed ACK user, that particular assumed ACK user will be ignored under the conclusion that this assumed ACK user does not exist or, at least, is not causing any interference.

Signals for the CQI channels are decoded using additional information, such as the particular scrambling code, radio network temporary identifier (RNTI), and the like, which are not included in the semi-static information and are, thus, unknown to the femto cell 1010. Therefore, the femto cell 1010 may not decode CQI channels in this first DTX processing phase. The femto cell 1010 will decode the ACK information encoded in the second pilot symbol as well as the CQI information. For example, in the format $2b$ CQI channel, there are 2 bits in this ACK channel leading to four hypotheses. For each hypothesis, the log likelihood ratio (LLRs) for each CQI symbol are computed, the absolute values of the LLRs are summed, and the hypothesis with the maximum summation is considered to be the correct hypothesis. The femto cell 1010 measures the SNR for each of the assumed maximum CQI users and compares that SNR against a threshold value. If the measured SNR fails to meet the threshold value for that particular assumed CQI user, it will be ignored. If, however, the measured SNR meets or exceeds the threshold value, that particular assumed CQI user will be designated for further processing.

It should be noted that various aspects of the present disclosure may measure and compare SNRs using different methods. For example, one method may provide for the femto cell 1010 to measure the SNR of the CQI users and calculate an estimation of SNR/(1+SNR). The femto cell 1010 would use this estimation to compare against a given threshold value.

assumed maximum number of ACK users and the assumed maximum number of CQI users from the received signal. Through this decoding and estimating process, the femto cell 1010 is able to identify certain of the assumed maximum ACK and CQI users that may potentially be interfering users and certain of the assumed maximum ACK and CQI users that may be ignored. For these potentially interfering ACK and CQI users, signals are reconstructed using the decoded and estimated signals. These reconstructed signals are then used by the femto cell 1010 in a second DTX detection phase.

Unlike the first DTX detection phase, in which the femto cell 1010 performs operations on the assumed maximum number of both ACK and CQI users, the femto cell 1010 performs operations using the identified potentially interfering users in the second DTX detection phase. For each reconstructed signal of the remaining potentially-interfering users, a residual signal is created by subtracting the reconstructed signal from the received signal. The femto cell 1010 compares the accumulated energy level of the residual signal against the accumulated energy level of the received signal and then compares that relationship between the accumulated energy level of the residual and received signals against a threshold value for each of the remaining potentially-interfering users. If the relationship between the accumulated energy levels of the residual and received signals does not meet this threshold, that particular potentially interfering user may now be ignored. If, however, the relationship exceeds the threshold value, the femto cell 1010 identifies that particular potentially-interfering user as an actual interfering UE and performs interference cancellation of its corresponding interfering signal.

In another example illustrated in FIG. 10, the UE 1011 is in communication with the femto cell 1009, and experiences interference from uplink signals in each of the cells 1001-1003. In the previous example involving the femto cell 1010, interference was only experienced from one other cell, the cell 1003. In the present example with regard to the femto cell 1009, there are multiple neighboring cells from which interfering signals originate. In performing the blind interference cancellation, the femto cell 1009 performs the same procedures by conducting two DTX detection phases for PUCCH ACK, CQI, or combined ACK/CQI channels. However, prior to initiating the first DTX detection phase, the femto cell 1009 will rank each of the cells 1001-1003 in an order for performing the blind interference cancellation.

In theory, the femto cell 1009 would create a cancellation order for each of the interfering UEs. However, because the strength of the interfering UE would not be known until the signals are decoded or estimated and the SNRs of those decoded/estimated signals measured, the femto cell 1009 generates a cancellation order of the neighboring cells, the cells 1001-1003, instead. Within each neighbor cell, all of the interfering UEs will be cancelled at the same time, as described above. In order to generate this order of cancellation, the femto cell 1009 measures the noise level of each of the cells 1001-1003. Each of the cells 1001-1003 will then be ranked for cancellation in order according to its relative noise level. As noted above, a lower noise level would tend to indicate a stronger cell, which would likely contribute more to interference. In contrast, a higher noise level of the cell would tend to indicate a weaker cell, without as much interference contributed. Therefore, the femto cell 1009 will rank the cells 1001-1003 in an order of cancellation, with the cell having the lowest noise level ranked for processing first, followed by the other cells with increasing noise levels.

For the sake of the described example, the femto cell 1009 measures the lowest noise level for the cell 1002, the next lowest noise level for the cell 1001, and the highest noise level of the three cells for the cell 1003. Once the cells 1001-1003 have been ranked, the femto cell 1009 begins the two-phase DTX detection process with the cell 1002, after which all of the interfering signals from the UEs 1014-1016 are cancelled. The femto cell 1009 then conducts the same blind interference cancellation procedures for the cells 1001 and 1003, until all of the interfering signals from cells 1001-1003 have been canceled.

Figure 11:
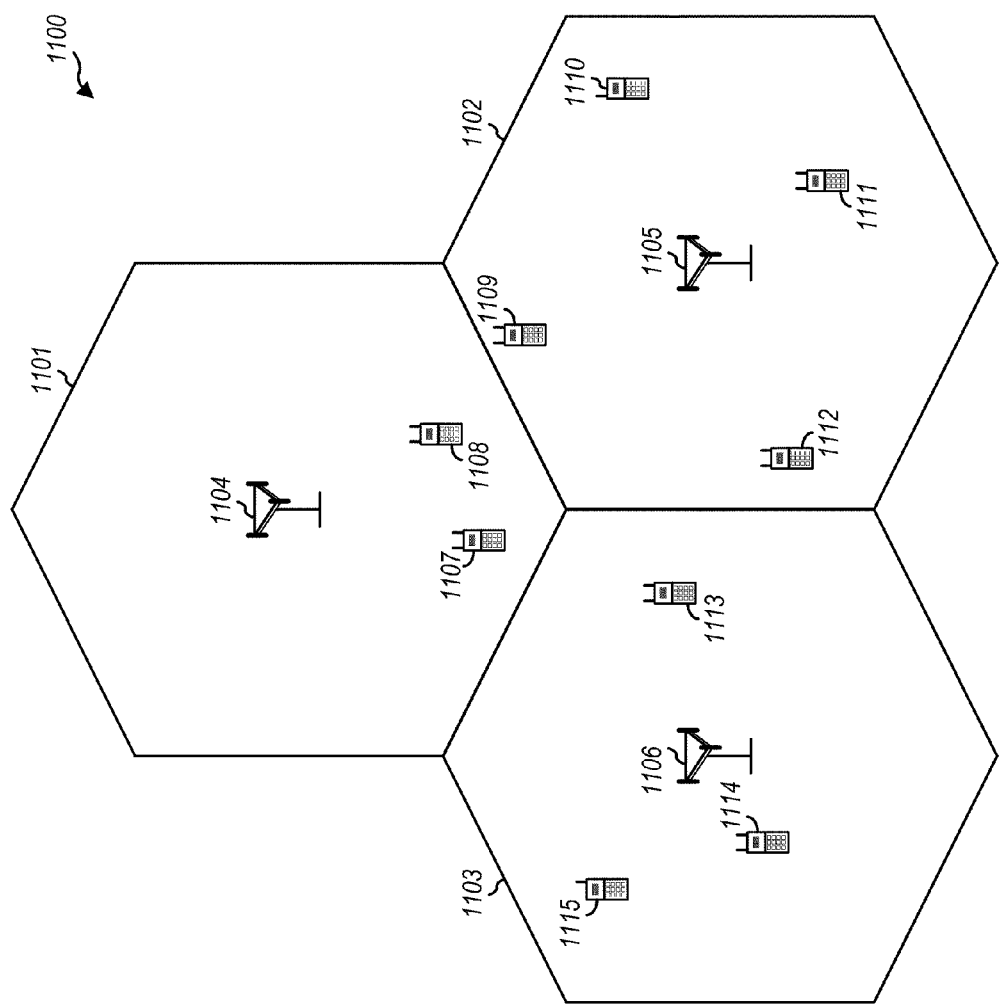
FIG. 11 illustrates a block diagram of an exemplary homogeneous communication network.

It should be noted that the various aspects of the present disclosure are not limited only to implementation in heterogeneous communication networks. FIG. 11 is a block diagram illustrating a homogeneous communication network 1100 configured according to one aspect of the present disclosure. The illustrated portion of the homogeneous communication network 1100 includes cells 1101-1103 each served by macro base stations 1104-1106. However, the macro base stations 1104-1106 are not in direct communication with one another for purposes of resource or interference coordination. Accordingly, the macro base station 1105, for example, has no detailed scheduling information for any of the UEs 1107, 1108, and 1113-1115. Therefore, if uplink communications from UEs 1107, 1108, and 1113-1115 were interfering with uplink communications from UE 1112, the macro base station 1105 would have insufficient information to perform traditional interference cancellation of the interfering signals.

Instead, the macro base station 1105 may blindly detect and cancel the interfering signals based on semi-static information that it receives through broadcast system messages from the macro base stations 1104 and 1106. The macro base station 1105 may perform the blind interference cancellation using the process as described in detail with regard to FIG. 10. The macro base station 1105 obtains semi-static information from system messages broadcast by the macro base stations 1104 and 1105. It then measures the noise level of each of cells 1101 and 1103. Based on the level of noise, the macro base station 1105 ranks cells 1101 and 1103 for interference cancellation.

In a first DTX detection phase with the highest ranked cell, for example the cell 1103, the macro base station 1105 decodes the ACK channel signals and estimates the CQI channel signals for each of the assumed maximum number of ACK and CQI users in the cell 1103. Because the ACK signals can be decoded, the macro base station 1105 can determine whether that assumed ACK user is in DTX or actually transmitting from the decoded signal. Determination of DTX for the CQI users takes a little further processing. The macro base station 1105 determines the SNRs of each of the estimated CQI signals and compares the SNRs against a threshold. All of the estimated CQI user signals that meet or exceed the threshold and the decoded ACK signals found not to be in DTX will be further processed in a second DTX detection phase, while any DTX ACK users and any estimated CQI users that did not meet the noise threshold are ignored. The macro base station 1105 then reconstructs the signals using the decoded/estimated ACK and CQI channels.

In the second DTX detection phase, only the assumed ACK and CQI channels meeting the noise threshold are further processed. A residual signal is created for each such potentially interfering user by subtracting the reconstructed signal from the originally received signal. The macro base station 1105 compares a relationship of accumulated energies between the residual signal and the originally received signal to another threshold value. If this energy relationship for each of the potentially interfering users meets or exceeds the threshold, the ACK or CQI users associated with that reconstructed signal are identified as actual interfering UEs. The macro base station 1105 may then cancel the interfering signals from these UEs All other potentially interfering users that do not meet this threshold may be ignored.

Figure 12:
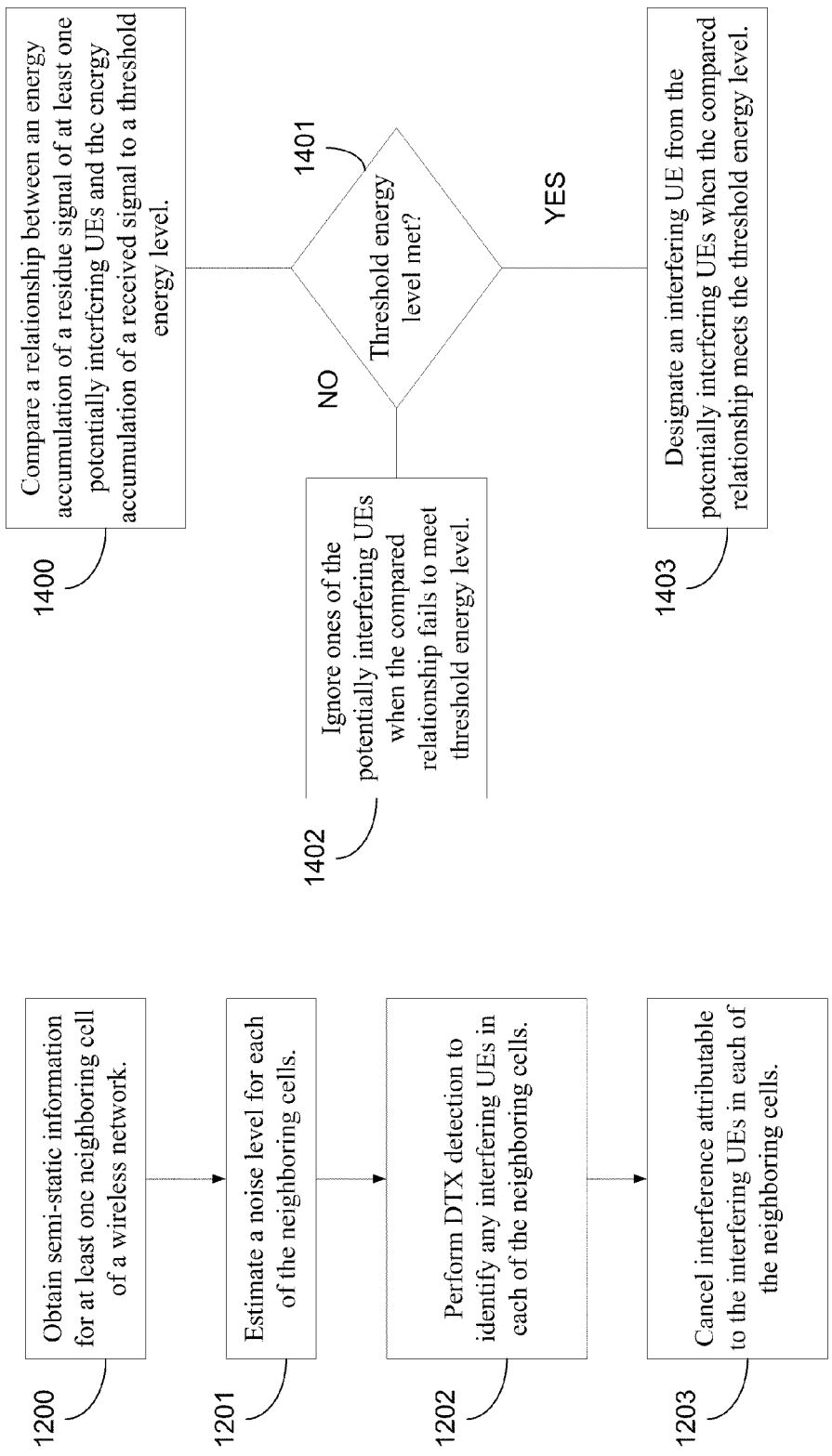
FIG. 12 illustrates a functional block diagram of an exemplary blocks executed to implement one aspect of the present disclosure.

FIG. 12 is a functional block diagram illustrating example blocks executed to implement one aspect of the present disclosure. In block 1200, semi-static information is obtained for at least one neighboring cell of a wireless network. A noise level for each of the neighboring cells is estimated in block 1201. DTX detection is performed, in block 1202, to identify any interfering UEs in each of the neighboring cells. Also, in block 1203, interference attributable to the identified interfering UEs is canceled for each of the neighboring cells.

Figure 13:
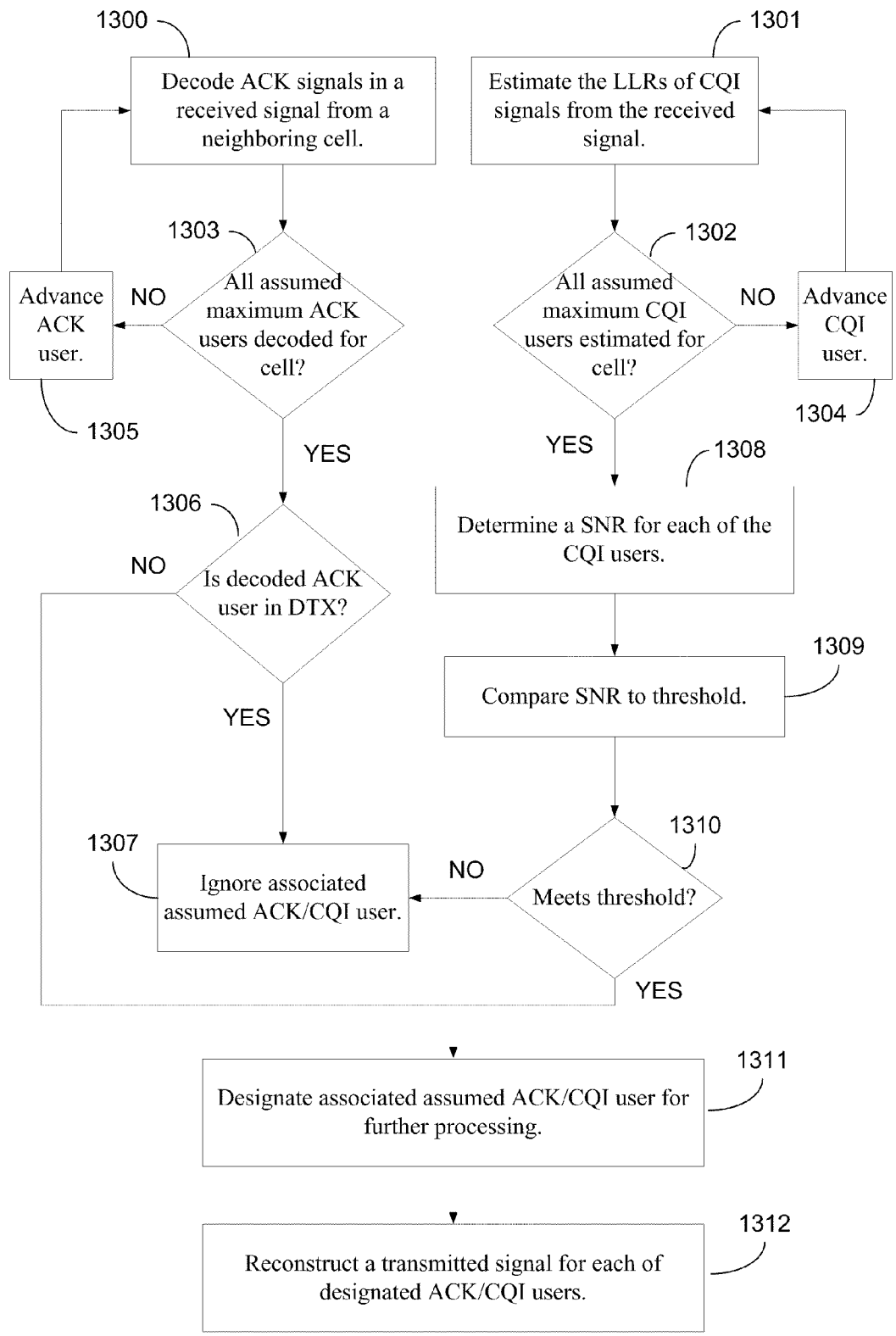
FIG. 13 illustrates a functional block diagram of an exemplary implementation of a first phase of a DTX detection process.

FIG. 13 is a functional block diagram illustrating example blocks executed to implement a first phase of the DTX detection process configured according to one aspect of the present disclosure. In block 1300, ACK signals in a received signal from a neighboring cell are decoded. In block 1301, the LLRs of CQI signals are also estimated from the received signal. In block 1302, a determination is made whether all of the assumed maximum CQI users for cell have been estimated. Similarly, in block 1303, a determination is made whether all of the assumed maximum ACK users for the cell have been decoded. If neither determination is true, then, for CQI users, the process is advanced to next assumed CQI user in block 1304, and, for ACK users, the process is advanced to next assumed ACK user in block 1305. If all of the ACK users have been decoded, then, in block 1306, another determination is made as to whether the decoded ACK users are in DTX. If so, then, in block 1307, the associated ACK user is ignored.

If the determination of block 1302 is that all of the CQI users have been estimated, then, in block 1308, a SNR is determined for each of the CQI users. The determined SNR is compared to a threshold in block 1309. A determination is made, in block 1310, whether the determined SNR meets a particular threshold. If not, then, in block 1307, the associated assumed CQI users not meeting the threshold are ignored. Otherwise, if the threshold has been met, as determined in block 1310, and/or the decoded ACK user is not in DTX, as determined in block 1306, the associated assumed ACK/CQI users are designated, in block 1311, for further processing. In block 1312, a transmitted signal is reconstructed for each of such designated ACK/CQI users.

FIG. 14 is a functional block diagram illustrating example blocks executed to implement a second phase of the DTX detection process configured according to one aspect of the present disclosure. In block 1400, a relationship between an energy accumulation of a residue signal of at least one potentially interfering UEs and the energy accumulation of a received signal is compared to a threshold energy level. The residue signal is obtained by subtracting the reconstructed signal from the received signal. A determination is made, in block 1401, whether the energy accumulation relationship meets the threshold energy level. If not, then, in block 1402, the ones of the potentially interfering UEs that fail to meet threshold energy level are ignored. Otherwise, in block 1403, the potentially interfering UEs that do meet the threshold are designated to be interfering UEs. Once so designated, the interfering signals from the interfering UEs may be canceled.

In one configuration, the eNB 110 or base station 802 configured for wireless communication includes means for obtaining semi-static information for at least one neighboring cell of a wireless network, means for estimating a noise level in each of the neighboring cells, and means, executable for each of the neighboring cells, for performing DTX detection to identify at least one interfering UE and for cancelling interference attributable to the interfering UEs. In one aspect, the aforementioned means may be the processor(s), the controller/processor 580, the memory 582, the receive processor 558, the MIMO detector 556, the demodulators 554*a*, and the antennas 552*a*, or Rx antennas 806, receiver 810, demodulator 812, data processor 814, memory 816, interference cancellation apparatus 822, including transceiver 702, data processor 704, and memory 706 configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 12-14, and any additional described processes may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   obtaining semi-static information for at least one neighboring cell of a wireless network;
   estimating a noise level in each of said at least one neighboring cell; and
   for each of said at least one neighboring cell:
      performing discontinuous transmission (DTX) detection to identify at least one interfering user equipment (UE); and
      cancelling interference attributable to said at least one interfering UE.

2. The method of claim 1 wherein said at least one neighboring cell comprises a plurality of neighboring cells, said method further comprising:
   ranking each cell of said plurality of neighboring cells in an order for said performing and said cancelling, wherein said ranking is based on said noise level of each of said plurality of neighboring cells.

3. The method of claim 1 wherein said performing said DTX comprises first and second processing phases, said first processing phase comprising:
   for each of a plurality of assumed UEs in said at least one neighboring cell, performing at least one of:
      decoding acknowledgement (ACK) signals in a received signal from said at least one neighboring cell; and
      estimating the log likelihood ratios (LLRs) of channel quality indicator (CQI) signals from said received signal.

4. The method of claim 3 wherein said first processing phase further comprises:
   determining a CQI signal-to-noise ratio (SNR) for each of said CQI signals in said at least one neighboring cell; and
   comparing said determined CQI SNR to a threshold level.

5. The method of claim 3 wherein said plurality of assumed UEs comprises a maximum number of UEs allowed by said at least one neighboring cell, said maximum number obtained using said semi-static information.

6. The method of claim 3 wherein said decoding said ACK signals assumes a predetermined ACK payload size.

7. The method of claim 4 wherein said first processing phase further comprises:
   ignoring DTX UEs of said plurality of assumed UEs when one or more of:
      said determined CQI SNR associated with said CQI signals fails to meet said threshold level; and
      said decoded ACK signals indicate said DTX UEs are in DTX.

8. The method of claim 4 wherein said first processing phase further comprises:
   designating at least one potentially interfering UE of said plurality of assumed UEs when one of:
      said determined CQI SNR associated with one of said CQI signals of said at least one potentially interfering UE meets said threshold level; and
      said decoded ACK signals indicate a transmitting UE; and
   reconstructing a transmitted signal for each of said at least one potentially interfering UE.

9. The method of claim 8 wherein said second processing phase comprises:
   comparing a relationship between an energy accumulation of a residue signal of said at least one potentially interfering UE and said energy accumulation of said received signal to a threshold energy level, wherein said residue signal comprises said reconstructed signal subtracted from said received signal;
   ignoring ones of said at least one potentially interfering UE when said compared relationship fails to meet said threshold energy level; and
   designating said at least one interfering UE from said at least one potentially interfering UE when said compared relationship meets said threshold energy level.

10. An apparatus configured for wireless communication, comprising:
    means for obtaining semi-static information for at least one neighboring cell of a wireless network;
    means for estimating a noise level in each of said at least one neighboring cell; and
    for each of said at least one neighboring cell:
       means for performing discontinuous transmission (DTX) detection to identify at least one interfering user equipment (UE); and
       means for cancelling interference attributable to said at least one interfering UE.

11. The apparatus of claim 10 wherein said at least one neighboring cell comprises a plurality of neighboring cells, said apparatus further comprising:
    means for ranking each cell of said plurality of neighboring cells in an order for said means for performing and said means for cancelling, wherein said means for ranking uses said noise level of each of said plurality of neighboring cells.

12. The apparatus of claim 10 wherein said performing said DTX comprises first and second processing phases, said first processing phase comprises:
    for each of a plurality of assumed UEs in said at least one neighboring cell, performing at least one of:
       means for decoding acknowledgement (ACK) signals in a received signal from said at least one neighboring cell; and
       means for estimating the log likelihood ratios (LLRs) of channel quality indicator (CQI) signals from said received signal.

13. The apparatus of claim 12 wherein said first processing phase further comprises:
    means for determining a CQI signal-to-noise ratio (SNR) for each of said CQI signals in said at least one neighboring cell; and means for comparing said determined CQI SNR to a threshold level.

14. The apparatus of claim 12 wherein said plurality of assumed UEs comprises a maximum number of UEs allowed by said at least one neighboring cell, said maximum number obtained using said semi-static information.

15. The apparatus of claim 12 wherein said decoding said ACK signals assumes a predetermined ACK payload size.

16. A computer program product for wireless communications in a wireless network, comprising:
   a non-transitory computer-readable medium having program code recorded thereon, said program code comprising:
      program code to obtain semi-static information for at least one neighboring cell of a wireless network;
      program code to estimate a noise level in each of said at least one neighboring cell; and
      program code to perform discontinuous transmission (DTX) detection to identify at least one interfering user equipment (UE); and
      program code to cancel interference attributable to said at least one interfering UE, wherein said program code to perform and said program code to cancel are executable for each of said at least one neighboring cell.

17. The computer program product of claim 16 wherein said at least one neighboring cell comprises a plurality of neighboring cells, said computer program product further comprising:
   program code to rank each cell of said plurality of neighboring cells in an order for execution of said program code to perform and said program code to cancel, wherein said program code to rank uses said noise level of each of said plurality of neighboring cells.

18. The computer program product of claim 16 wherein said performing said DTX comprises first and second processing phases, said first processing phase comprises:
   program code to decode acknowledgement (ACK) signals in a received signal from said at least one neighboring cell; and
   program code to estimate the log likelihood ratios (LLRs) of channel quality indicator (CQI) signals from said received signal, wherein said program code to decode and said program code to estimate are executable for each of a plurality of assumed UEs in said at least one neighboring cell.

19. The computer program product of claim 18 wherein said first processing phase further comprises:
   program code to determine a CQI signal-to-noise ratio (SNR) for each of said CQI signals in said at least one neighboring cell; and
   program code to compare said determined CQI SNR to a threshold level.

20. The computer program product of claim 18 wherein said plurality of assumed UEs comprises a maximum number of UEs allowed by said at least one neighboring cell, said maximum number obtained using said semi-static information.

21. The computer program product of claim 18 wherein said program code to decode said ACK signals assumes a predetermined ACK payload size.

22. An apparatus configured for wireless communication, said apparatus comprising:
   at least one processor; and
   a memory coupled to said at least one processor,
   wherein said at least one processor is configured:
      to obtain semi-static information for at least one neighboring cell of a wireless network;
      to estimate a noise level in each of said at least one neighboring cell; and
      for each of said at least one neighboring cell:
         to perform discontinuous transmission (DTX) detection to identify at least one interfering user equipment (UE); and
         to cancel interference attributable to said at least one interfering UE.

23. The apparatus of claim 22 wherein said at least one neighboring cell comprises a plurality of neighboring cells, said at least one processor further configured:
   to rank each cell of said plurality of neighboring cells in an order for said DTX detection and said interference cancellation, wherein said configuration of said at least one processor to rank is based on said noise level of each of said plurality of neighboring cells.

24. The apparatus of claim 22 wherein said configuration of said at least one processor to perform said DTX comprises first and second processing phases, said first processing phase comprises:
   for each of a plurality of assumed UEs in said at least one neighboring cell, configuration of said at least one processor to one of:
      decode acknowledgement (ACK) signals in a received signal from said at least one neighboring cell; and
      estimate the log likelihood ratios (LLRs) of channel quality indicator (CQI) signals from said received signal.

25. The apparatus of claim 24 wherein said first processing phase further comprises said at least one processor configured:
   to determine a CQI signal-to-noise ratio (SNR) for each of said CQI signals in said at least one neighboring cell; and
   to compare said determined CQI SNR to a threshold level.

26. The apparatus of claim 24 wherein said plurality of assumed UEs comprises a maximum number of UEs allowed by said at least one neighboring cell, said maximum number obtained using said semi-static information.

27. The apparatus of claim 24 wherein said configuration of said at least one processor to decode said ACK signals assumes a predetermined ACK payload size.

* * * * *